United States Patent [19]

Larner et al.

[11] 3,976,835

[45] Aug. 24, 1976

[54] SUPERVISORY SYSTEMS FOR TELECOMMUNICATION LINE TRANSMISSION SYSTEM

[75] Inventors: Douglas Stanley Larner, Twickenham; Velauthar Kopalapillai Thillainayagam, Maidenhead; Ronald William Blackmore, Maidenhead; Barry Michael Ernest Hill, Maidenhead, all of England

[73] Assignee: Plessey Handel und Investments A.G., Zug, Switzerland

[22] Filed: Dec. 18, 1974

[21] Appl. No.: 534,133

[30] Foreign Application Priority Data

Dec. 18, 1973 United Kingdom............... 58463/73

[52] U.S. Cl. ..................... 178/70 R; 179/175.31 R
[51] Int. Cl.² ..................... H04B 3/46; H04L 25/20
[58] Field of Search ............ 178/71 T, 71 R, 70 R, 178/23 A; 179/175.31 R, 2 A; 325/41

[56] References Cited
UNITED STATES PATENTS

| | | | |
|---|---|---|---|
| 3,370,134 | 2/1968 | Johannesson et al. | 179/175.31 R |
| 3,560,670 | 2/1971 | Heyes et al. | 179/175.31 R |
| 3,760,127 | 9/1973 | Camiciottoli et al. | 179/175.31 R |

*Primary Examiner*—Thomas A. Robinson
*Attorney, Agent, or Firm*—Fleit & Jacobson

[57] ABSTRACT

A repeater for a digital data-transmission system using a disparity-displaying digital code comprises a digital regenerator and error-detecting means therefor and in which supervisory control means incorporated in the repeater is operative upon reception of an interrogate pulse signal over one access path also used as a digital-data path, to cause a response signal to be returned over the access path according to the prevailing state of the error detecting means. The response signal comprises a different number of pulses for each of the two possible output states of the error detecting means.

The repeater may be the first of a pair of repeaters of a particular repeater station, both repeaters including at least substantially identical digital regenerators and error-detecting means. The repeaters are incorporated in different digital data-transmission paths and are so interconnected that the reception of an interrogate pulse signal by the first repeater is effective in that the aforesaid response signal takes into account th prevailing state of the error-detecting means serving the digital regenerator of the second repeater.

5 Claims, 6 Drawing Figures

SUPERVISORY SYSTEMS FOR TELECOMMUNICATION LINE TRANSMISSION SYSTEM

BACKGROUND AND SUMMARY OF THE INVENTION

The present invention relates to electrical signalling system and is more particularly concerned with a signalling system applicable to a high-speed data transmission system employing repeater stations along its route, and in which the data transmission is effected in a so-called disparity-displaying or self-checking form of digital coding over say coaxial cables constituting the transmission media.

In a system of this kind two main types of repeaters may be used namely (a) dependent repeaters which require to be fed with power over the transmission media and (b) so-called intermediate or power-feeding repeaters which have integral power supplies and which in conjunction with terminal station equipments provide the electrical power-supplies for the whole system.

One form of monitoring and status reporting in respect of a transmission system using dependent and power-feeding repeaters is disclosed in co-pending application Ser. No. 16141/71, and in that system the digital regenerator of each repeater of both types has an error detector individually associated with it and performing a continuous monitoring function as regards its output. Indeed this detector produces a fault status signal in the event of either of two conditions arising, namely (a) that the output of digital regenerator has ceased or (b) that an error-rate-limit has been reached in respect of digital-transmission code disparities. In the known system, status interrogation in respect of the whole system is effected from a particular end (terminal station) at regular intervals (typically 5 seconds) by an interrogate signal pulse developed there at these intervals and subjected to regeneration at each repeater involved and extended to its successor. The repeater, upon detecting an interrogate signal at a particular access path, is required to return a response signal (indicative of the prevailing status) to that access path for extension to the interrogating terminal station by any intervening repeaters; signal regeneration processes being employed at the repeaters involved. Regeneration of the interrogate signal pulse by a repeater is effected upon completion of the response signal sequence.

Also in the system of the co-pending Application, addition monitoring and status reporting facilities are provided at power-feeding repeaters in respect of salient points of the particular repeater stations. When an interrogate signal is received at such a repeater, an extended period of interrogation and reporting is developed for it, to permit the additional response signals to be developed and transmitted back to the interrogating terminal station, prior to the interrogate signal being regenerated to the next repeater.

An object of the present invention is to provide a supervisory system of the general kind outline but which offers improved facilities and enables more accurate interpretation of response signals to be effected.

According to the invention there is provided a repeater for a digital data-transmission system using a disparity-displaying digital code, and including a digital regenerator and error-detecting means therefor and characterised in that supervisory control means incorporated in the repeater is operative upon reception of an interrogate pulse signal, over one access path also used as a digital-data path, to cause a response signal to be returned over said access path according to the prevailing state of said error-detecting means, said response signal comprising a different number of pulses for each of the two possible output states of said error-detecting means.

According to the invention said repeater is the first of a pair of repeaters of a particular repeater station, both repeaters including at least substantially identical digital regenerators and error-detecting means, and being incorporated in different digital data-transmission paths, said repeaters being so interconnected that the reception of a said interrogate pulse signal by said first repeater is effective in that the aforesaid response signal also takes into account the prevailing state of the error-detecting means serving the digital regenerator of the second repeater.

Also according to the invention there is provided a digital-data line-transmission system comprising two repeated transmission paths between terminal stations, in which, at each repeater station of the system, a repeater of the kind referred to above is provided for each transmission path, and as a result of an interrogate pulse signal generated at one said terminal station and applied to one transmission path serving a corresponding repeater of each station the supervisory control means of each said repeater successively upon reception of an interrogate pulse is operative to return a response signal to its access path and to effect delayed regeneration of the received interrogate pulse signal to the succeeding repeater (if any) of said transmission path; the supervisory control means of each repeater also being controlled by reception of a response signal to regenerate that response signal and apply it to its access path.

The invention will be better understood from the following description of methods of carrying it into effect which should be read in conjunction with the accompanying drawings comprising FIGS. 1 through 6.

BRIEF DESCRIPTION OF THE DRAWINGS

FIG. 5 depicts modifications to the repeater of FIG. 4 which are necessary to convert it to an alternative form of power-feeding repeater; whereas

DETAILED DESCRIPTION OF THE INVENTION

Figure 1:
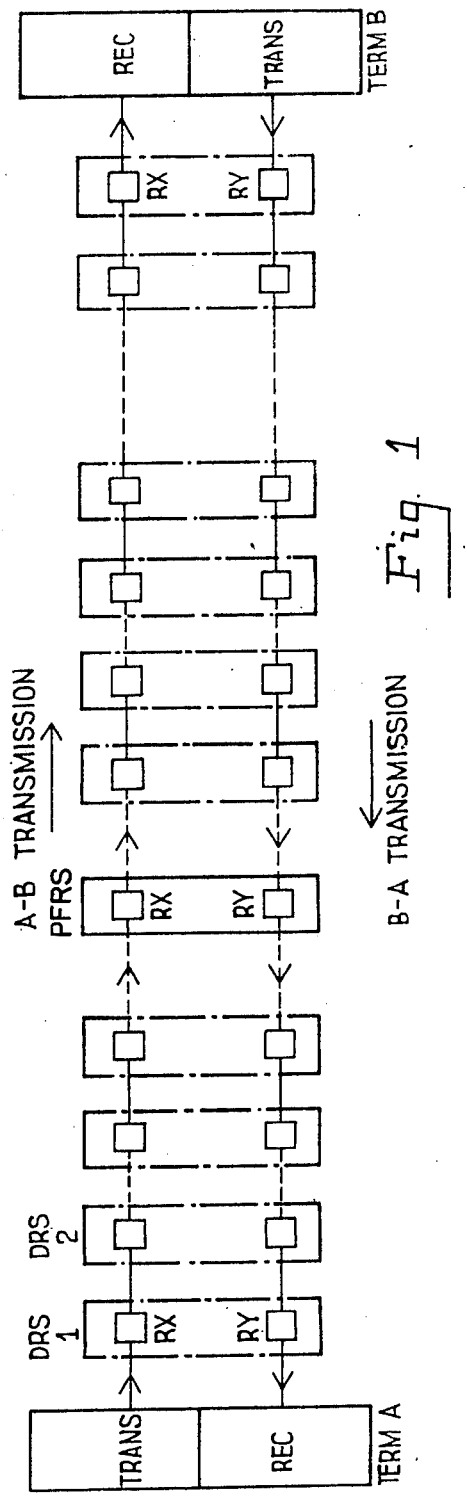
FIG. 1 shows in outline a bi-directional digital-data transmission system.
Figure 2:
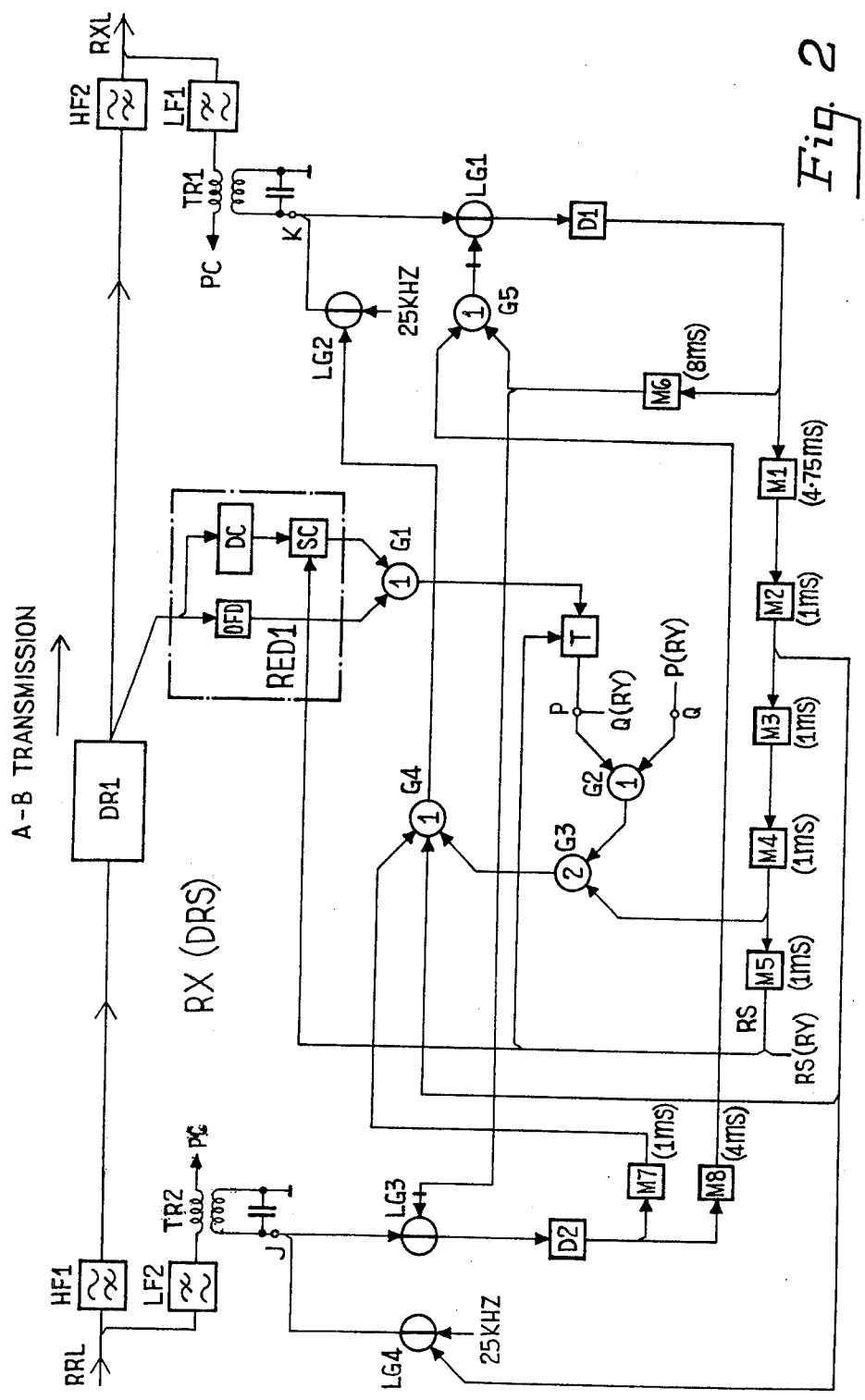
FIG. 2 represents in block schematic form the circuit arrangements of a so-called dependent repeater used in said transmission system.
Figure 3:
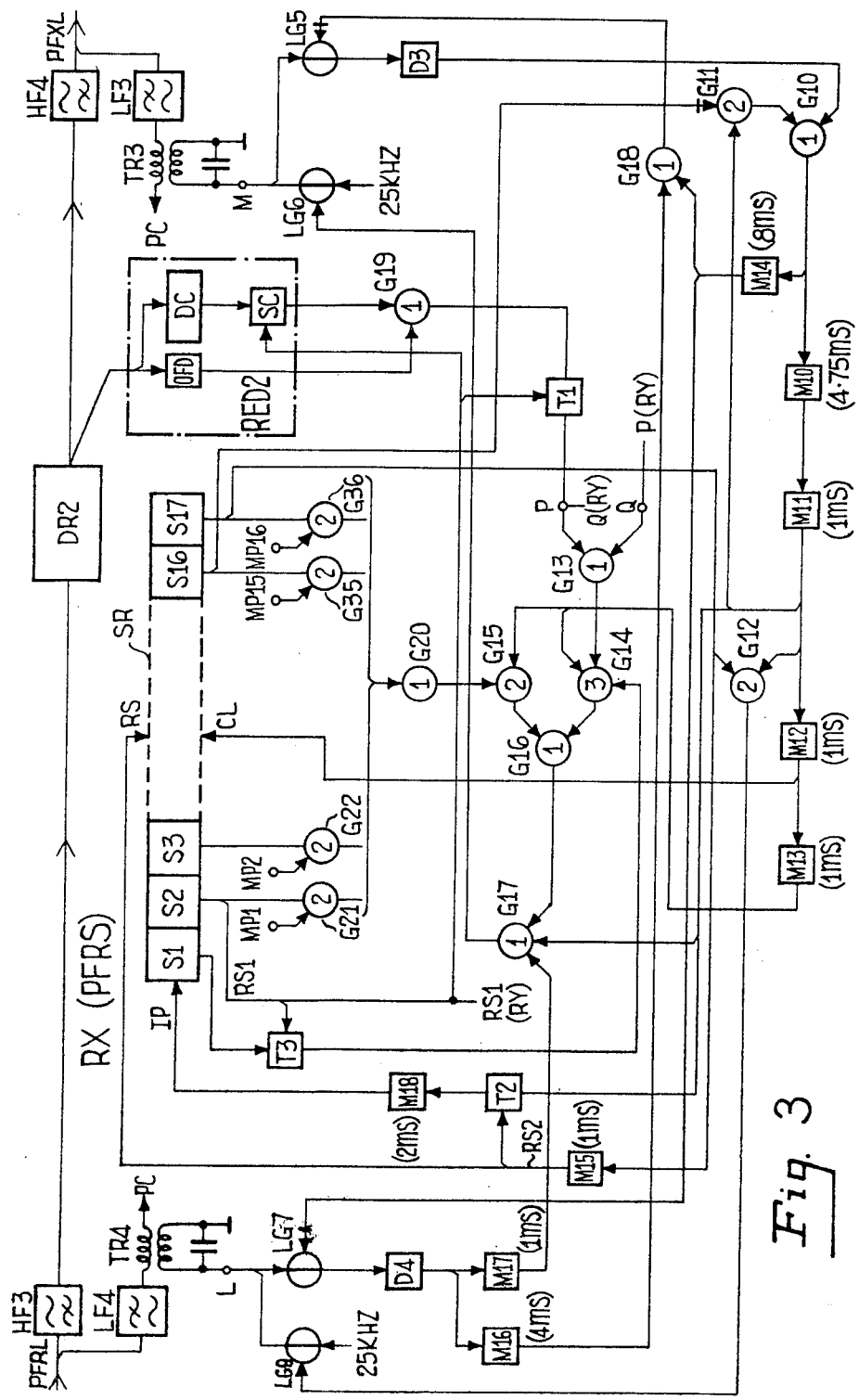
FIG. 3 is a block schematic diagram of a typical powerfeeding repeater of said system.

Referring to FIG. 1, the data transmission system (which should be assumed as incorporating repeaters in accordance with FIG. 2 and FIG. 3) involves stations TERM A and TERM B using a separate co-axial cable transmission-path for each direction of transmission A to B and B to A. Repeater stations are located at predetermined points between the terminal equipments. The majority of these stations, such as those designated DRS1 and DRS2, are termed dependent repeater stations because they have to be provided with electrical power over the transmission medium; conveniently these stations may be mounted in small underground manholes. Other repeater stations such as that designated PFRS are to be referred to as intermediate or power-feeding repeater stations. Each of the intermediate repeater stations is provided with local power sources and serves in known manner to extend power to a plurality of successive dependent repeaters at both sides of it. Each terminal equipment is also used as a power source for a succession of dependent repeaters starting with that which is adjacent to it. Power-feed turn-round arrangements of a known kind are employed in respect of two adjacent dependent repeater stations located between successive power-feeding repeater stations and between each terminal station and that power-feeding repeater station which is nearest to it.

Each repeater station DRS1, DRS2 ... , PFRS ... , and so on, includes a repeater such as RX for the A to B direction of date transmission and a repeater RY for the opposite direction of transmission; each repeater essentially including a uni-directional digital regenerator and an error-detector associated individually with that regenerator. The dependent repeater stations DRS1, DRS2 and the like, in other respects also, are virtually identical except in the case of those concerned with the power-feed turn-round functions which are subject to simple adaptation for this purpose. The power-feed repeater stations such as PFRS, however differ from the dependent stations insofar as additional fault monitoring arrangements are included in respect of the power supply and feed facilities, and possibly for other functions provided at these stations.

At this juncture it is convenient to assume that equipment REC, terminating the A to B transmission line, incorporates system monitoring and display means. In this case the last-mentioned equipment enables so-called interrogate pulses of (25KHz) 1 m.S. duration to be injected into the receive cable of the transmission path (A to B) at 5 second intervals. Each such interval is such as to enable a complete interrogation and reporting cycle to be performed in respect of the whole transmission system. At the first repeater station (dependent), each interrogate pulse is detected, by the relevant repeater RX, and then regenerated after an inteval of 5 m.S. for transmission to the next station. Concurrently with the regeneration of the interrogate pulse, a response signal pulse (1 m.S. at 25 KHz) is returned to the interrogating terminal station over the data-transmission path and may be followed after a delay of 1 m.S. by another similar pulse if the particular repeater RX and/or the partner repeater RY is in a condition of fault (failure or disparity) in respect of data-regeneration functions of the station. In the absence of such a fault, the second pulse is not generated and the one-pulse signal, evident in the time slot appertaining to the particular dependent repeater station, signifies that no pertinent reportable fault exists.

It can be deduced that in the case of a succession of dependent repeater stations, each of them receives one interrogate pulse 5 m.S. after that of the preceding station, and each of the stations will generate a one-pulse or a two-pulse response signal in the time-slot appropriate to the station. The response signals obtained at each station are promptly regenerated at each succeeding station and consequently a string of signals appertaining to the stations is extended to the monitoring and display means incorporated in equipment REC at terminal TERM B.

When, in the present example, an interrogate pulse is delivered to a repeater RX (FIG. 3) of a power-feeding repeater station as a result of regeneration processes performed by intervening repeaters RX, that pulse is operative after 5 m.S. in causing an initial 1 m.S. (25 KHz) response pulse to be returned repeater-by-repeater to equipment REC of the interrogating terminal TERM B. However, unlike the case of a dependent repeater station, the interrogate pulse is not regenerated for transmission to the next station at this juncture, although a sequence is initiated whereby, after a delay of 1 m.S., a second response pulse is extended in the direction of the interrogating terminal if a reportable fault prevails in respect of either or both of the data regenerators of the station.

However, within the repeater RX of the power-feeding station, a succession of substantially 5 m.S. periods are defined; the number (which is additional to that concerned with the reporting of the state of the data-regenerators) corresponding to the number of before-mentioned additional fault monitoring facilities provided thereat. Typically sixteen such additional facilities are catered for. At the end of each 5 m.S. period of the sequence, an initial response pulse is sent back to the interrogating terminal station and then the state of a lead appertaining to a particular fault monitoring facility is assessed. Accordingly, if the state of the particular lead is indicative of a fault condition, a second response pulse is generated after a 1 m.S. delay; the pulse being inhibited if no fault exists.

It follows that upon reception of an interrogate pulse by the repeater RX of a power-feeding repeater station, a succession of typically seventeen response signals are sent back to the interrogating terminal at substantially 5 m.S. intervals; each signal comprising one pulse or two pulses to indicate correct or faulty condition respectively of the functions being monitored. It will be appreciated that the first response signal is always relevant to the data regenerators of the two repeaters of the station.

From all the foregoing it can now be deduced that in the typical instance of interrogate pulses being injected, by receive equipment REC of terminal station TERM B, into the A to B data-transmission path, a sequence of response signals appertaining to the states of all the repeater stations (dependent and power-feeding) should be forthcoming at said receive equipment. Moreover these signals take into account the collective states of the date regenerators of both repeaters RX and RY at each station; and the supplementary signals additionally forthcoming from each power-feeding repeater station are appropriate to the comprehensive situation encountered at the station. The signal sequence would be augmented by signals (again of the one-pulse/two-pulse type), derived from the transmit equipment TRANS of terminal station TERM A, in respect of conditions which are monitored at that station. The total information content of the complete response-signal sequence is consequently made available at terminal TERM B for analysis in respect of the location of any faults which are reported.

It will be appreciated that under some conditions of fault, an interrogate pulse transmitted from equipment REC of terminal station TERM B may result in an incomplete response-signal sequence being returned to it. Thus the case of absence of power, at any repeater station of the transmission system, would result in the absence of all signalling from that station and stations beyond it and in the presentation of regenerator fault response signals in respect of repeater stations located between the un-powered station and the interrogating terminal station. Analysis of the received response information sequence enables an assessment of the location of the fault to be made.

In the case of a data-regenerator fault (no-output or disparity condition) at a repeater of any station of the system it is to be understood that the pattern of signals of the complete sequence would be determined by the particular repeater RX or RY at which the fault is evident. Thus although (a) interrogation is being effected over the A to B data-transmission path, and (b) the particular response signal is itself inconclusive (i.e. the fault signal may be in respect of either or both of the data-regenerators of the station); the pattern of response signals enables the particular faulty regenerator to be identified. In this respect the faulty condition of the particular regenerator is in effect reproduced and reported for all regenerators which follow the faulty one as regards transmission direction.

As outlined above, when interrogation takes place from the receive equipment REC of terminal station TERM B, a sequence of response signals is normally presented to that equipment during every 5 seconds period and moreover, all available information relevant to the state of the whole bi-directional data transmission system is made evident at the interrogating station.

As an alternative to the above, interrogation may be effected in like manner from the receive equipment REC of terminal station TERM A.

Up to this juncture it has been assumed that interrogation is required to be performed from the receive end of a data-transmission path, i.e. interrogate pulses being applied in the opposite direction to data transmission. It will be shown, subsequently, that repeaters may be adapted to enable interrogation to be effected instead from the transmit end of a data-transmission path.

In the logical circuit diagrams comprising FIGS. 1, 2, 3, 4 and 5 subsequently to be described, various forms of gates are illustrated. An "OR" gate is represented by a circle, enclosing a digit "1", and having a plurality of arrowheaded input leads. It may be taken that an "OR" gate produces a "1" output when any or all of the input leads have "1" applied; but otherwise an "0" output is produced. An "AND" gate however differs in that the number of inputs is signified by the enclosed digit, and is normally arranged only to produce a "1" output when all the input leads are at "1"; the exception being when a so-called negated input (signified by a bar across the input lead) is used. In the latter case the negated lead is required to be at "0" to enable the gate to be satisfied. Linear gates for the passage of super-audio signals are also provided, and these are activated by a "1" signal or by a "0" signal applied to a normal or negated input lead respectively, as the case may be.

The dependent repeater is shown in detail in FIG. 2. The circuit arrangements shown are typical of all those comprising either of the two digital repeaters used at each of the dependent repeater stations DRS1, DRS2 and the like shown in FIG. 1. In actuality the circuit illustrated and designated RX (DRS) is one of those employed in the A to B transmission path of the bi-directional system; those employed in the B to A path being identical but facing the other way.

The 120 Mb/s digital-data forthcoming at the incoming line RRL, and being in the form of a so-called self-checking code, is applied to the digital-regenerator DR1 by way of the high-pass filter HF1; the output of the digital-regenerator being extended to the outgoing line over another high-pass filter HF2. The output of the digital-regenerator is additionally applied to its individual error detector RED1 which is preferably identical with that described in co-pending application Ser. No. 16141/71, and comprises an output failure detector OFD, a disparity counter DC and a storage counter SC. Device DC controls device SC, and the output lead of the latter controls one input lead of the OR gate G1; the other input lead being controlled by the failure detector OFD.

Briefly the error detector is operative in two ways. Firstly if the output of digital-regenerator DR1 ceases, the condition is detected by the output failure detector OFD which activates gate G1 to cause the bistable toggle T to be set. Secondly, the disparity counter DC being a two-directional linear counter is responsive to attain its upper or lower state of count only when an appropriate so-called negative or positive disparity-limit has been attained in respect of the digital-regenerator output. Upon attaining said upper or lower state of count, the counter DC extends a pulse to the storage counter SC. The counter SC, which is reset on the occurrence of a reset pulse derived every 5 seconds (i.e. repetition rate of system interrogate pulses), is advanced by each disparity-limit pulse derived from counter DC. When a predetermined state of count is attained, by the storage counter SC, an undesirable rate of disparity-limit conditions is signified. Accordingly, the storage counter activates gate G1 to cause the toggle T to be set.

In both modes of operation, under reportable regenerator-fault conditions, the error detector RED1 activates the bistable toggle T which connects a "1" signal to terminal P extending to an input lead of OR gate G2. Gate G2 is served over two terminals P and Q which are so intercoupled with corresponding terminals of the partner dependent repeater RY of the same station as the present repeater, that the setting of toggle T in either repeater causes the gate such as G2 in both repeaters to be activated whereby a "1" output is produced. This is the situation which would obtain in the event of either or both of the pair of repeaters being in a state of reportable fault in respect of regenerator output failure or disparity conditions.

Assuming that interrogation takes place over the A to B transmission path of the bi-directional system; the next occurring interrogate pulse (25 KHz) of 1 m.S. duration which is received at lead RXL, (either directly from the receive equipment of the interrogating terminal station or through an intermediary of one or more repeaters) is extended exclusively by way of the low-pass filter LF1 to the tuned transformer TR1 having an acceptance range of around 25KHz. The upper winding of the transformer, like that of a similar transformer TR2 at the incoming-data side of the repeater, extends to a power-deriving circuit arrangement PC (not shown). However, the lower winding of transformer TR1 extends the incoming interrogate pulse over the linear gate LG1 to the "tone" detector D1 which has an inherent response time of up to 0.25 m.S. The leading edge of the signal then produced by detector D1 activates the monostable device M1 which remains "set" for 4.75 m.S., whereas the trailing edge of said signal activates the monostable device M6 for a period of 8 m.S. Device M6, for said period, disables linear-gate LG1 by way of OR gate G5, together with a corresponding linear-gate LG3 at the other side of the repeater. When device M1 resets after 4.75 m.S., the 1 m.S. monostable device M2 is promptly set so that its "1" output signal of 1 m.S. duration is effective (a) in opening linear gate LG4 whereby the interrogate pulse (25 KHz) is effectively regenerated and extended by way of transformer TR2 and low-pass filter LF2 to repeater RX of the station ahead; and (b) in activating OR gate G4 whereby linear-gate LG2 is caused to return a 1 m.S. (25 KHz) response pulse to path RXL for communication to the interrogating terminal equipment.

When monostable device M2 resets, the initial response or marking pulse is terminated by gates G4 and LG2, and moreover the series-connected monostable devices M3 and m4 are successively set for 1 m.S. periods. During the period when device M4 is set, a "1" signal is applied to one of the two input leads of AND gate G3. The second input lead of gate G3 is controlled according to the state of the output lead of gate G2 which, as already inferred, is at "1" if a reportable digital-regenerator fault exists, but otherwise is at "0". If such a fault does exist, gate G3 is satisfied, and produces a "1" output so that gate G4 and linear gate LG2 are re-activated to cause a second response pulse to be sent to the interrogating terminal station.

It can now be seen that under the specified conditions of fault, in respect of either or both of the partner repeaters, two response pulses are developed, whereas when no such fault is encountered one response pulse (i.e. a marking pulse only) is developed.

However, when monostable device M4 is reset, monostable M5 is caused to assume the set state for 1 m.S., and during this period its "1" output signal causes the toggle T and the storage counter SC to be reset, if necessary, over lead RS. Lead RS extends to a corresponding lead of the partner repeater RY for possible similar resetting purposes. Thereupon the repeaters having completed their involvement in the current interrogation cycle will now await the next interrogation pulse, some 5 seconds later, whereupon the whole process is repeated.

The power feeding repeater is shown in detail in FIG. 3. The circuit arrangements are typical of those comprising either of the two digital repeaters used at each intermediate or power-feeding repeater station, such as PFRS in FIG. 1. The repeater illustrated and designated RX (PFRS) is one of those used in the A to B transmission path of the bi-directional system already described with reference to FIG. 1.

The digital-regenerator DR2 and its error detector RED2 (with its output fail detector OFD, disparity counter DC and storage couner SC) are identical with devices DR1 and RED1 respectively of the dependent repeater shown in FIG. 2. Likewise the high-pass filters HF3 and HF4 of the data path correspond with filters HF1 and HF2 of the previous diagram, and again low-pass filters LF3 and LF4 together with tuned transformers TR3 and TR4 are employed as in the dependent repeater.

The digital-regenerator DR2 is continuously monitored be detector RED2 and if a fault (output failure or disparity) is encountered, OR gate G19 is activated and the bistable toggle T1 is set. This applies a "1" signal to terminal P of a pair of terminals P and Q which like those of FIG. 2 are so interconnected with corresponding terminals of the partner repeater that a reportable fault condition from either repeater, or both repeaters, of the station results in OR gate G13 producing a "1" output signal. Conversely if neither repeater is reporting the particular form of fault, the output of G13 remains at "0".

When a 1 m.S. (25 KHz) interrogate signal is received (once every 5 seconds) at data-output lead PFXL of the repeater, the signal is applied over linear gate LG5 to the detector D3. This, after its inherent response time of up to 0.25 m.S., produces a "1" output condition to activate the OR gate G10. Thereupon monostable device M10 is activated by the "1" output of gate G10 for a period of 4.75 m.S. whereas retriggerable monostable device M14 is activated, for a period of 8 m.S., when the output of gate G10 reverts to "0" after 1 m.S. During the period for which the device M14 is set, the linear gate LG7 is inhibited, and OR gate G18 is activated to inhibit the linear gate LG5 also.

Five mS after cessation of the incoming interrogate signal, device M10 is reset and thereupon the monostable device M11 is set for a period of 1 m.S. to produce a "1" output condition. This is effective (a) to set the bistable trigger device T2 which sets the monostable device M18 for a period 2 m.S.; a pulse being applied to the input lead IP of shift register SR for this period, (b) to activate the linear gate LG6, over OR gate G17, so that an initial 1 m.S. response or marking pulse (25 KHz) is returned to the interrogating source, and (c) to cause actuation of gates G11 and G10 for 1 m.S. whereby device M10 is again set and monostable device M14 is retriggered to prevent resetting. It is to be noted that AND gate G12 is controlled jointly from device M11 and stage S17 of the shift register, and accordingly no interrogate pulse is regenerated at this juncture.

Meanwhile, device M11 is reset after 1 m.S. and thereupon sets the monostable device M12 for a period of 1 m.S., so that a clock pulse is delivered over lead CL to the shift register SR. Accordingly the "1" signal already applied to the input IP of the register is stored in the first stage S1 thereof. A "1" signal, now evident at the output of stage S1, promptly sets the bistable toggle device T3 which applies a "1" priming condition to AND gate G14. When device M12 is reset, the 1 m.S. monostable device M13 is set and therefore applies "1" to relevant input leads of gates G14 and G15. The situation now is that if a reportable regenerator fault is already evidenced by the fact that gate G13 is producing a "1" output, then gate G14 is activated so that the linear gate LG6 is opened for the 1 m.S. period of device M13. Thus under the fault conditions mentioned, a second response pulse (25 KHz) is sent back to the interrogation terminal; no such pulse being generated if no fault exists.

It is convenient to mention that monostable device M10 (4.75 m.S.) and M11 (1 m.S.) are included in a regenerative loop involving gates G11 and G10. Accordingly device m11 is set for 1 m.S. every 4.75 m.S. During the course of the re-cycling function, device M14 (8 m.S.) is prevented from resetting and thus maintains disablement of linear gates LG5 and LG7. Each time device M11 is set, it causes an initial response or marking pulse appertaining to an appropriate one of sixteen signalling points of the repeater station to be returned to the interrogating terminal. Moreover each time monostable device M11 is reset, devices M12 and M13 produce successive 1 m.S. output conditions. The "1" output pulse of M12 serves to clock the shift register whereas the "1" output pulse of device M13 serves to prime the AND gate G15.

Each time the shift register is clocked, the "1" condition originally stored in stage S1 is advanced from stage-to-stage so that the corresponding output lead is at "1" on a mutually exclusive basis. When stage S2 is activated, its output lead becomes "1" and is extended over the reset lead RS1 which (a) causes toggle T3 to be reset and (b) if necessary causes toggle T1 and storage counter SC (regenerator error detector) to be reset. Lead RS1 extends to a corresponding lead of the partner repeater of the station to effect such resetting of the last-mentioned repeater as may be necessary.

In addition to initiating said resetting functions, the output lead of register stage S2 extends to one input lead of AND gate G21. The output leads of stages S3 to S17 are likewise connected to AND gates G22 to G36. The other input lead of gates G21 to G36 are associated with terminals MP1 to MP16 respectively which are individually conditioned "1" or "0" according to the state of salient points at the repeater station. In each case, "1" signifies a fault whereas "0" is indicative of absence of fault.

If for the period that register stage S2 is active, terminal MP1 is at "1" to signify a fault, AND gate G21 is satisfied so that OR gate G20 extends "1" to the relevant input lead of gate G15. Accordingly when monostable device M13 next produces a 1 m.S. pulse, gates G15, G16 and G17 are activated and the linear gate LG6 is opened to cause a 1 m.S. supplementary response pulse to be sent back to the interrogating station. It can be deduced that, if no fault exists in respect of terminal MP1, no such supplementary pulse is generated and the one-pulse condition (marking pulse only) signifies that the monitored point is in order.

As in the case of terminal MP1, terminals MP2 to MP16 are successively interrogated as the shift register is advanced stage-by-stage, and, in each case, a one-pulse or two-pulse response signal is sent back to the interrogating station. Towards the end of this procedure, when register stage S16 is producing a "1" output exclusively, gate G11 is inhibited following activation of monostable devices M10 and M11 for the seventeenth time. Accordingly the ensuing shift-register clock pulse and the pulse concerned with interrogation of terminal MP16 are the last of the sequence. When register stage S17 duly produces a "1" output exclusively, it is effective in conjunction with monostable device M11 to cause the interrogate signal (1 m.S. – 25 KHz) to be advanced to lead PFRL by linear gate LG8. Register stage S17 also promptly sets monostable device M15 which, for a period of 1 m.S., applies a reset signal over lead RS2 to effect the resetting of toggle T2 and the shift register of the particular repeater.

The repeater RX of the power-feeding repeater station PFRS, may now be said to be in its quiescent state and awaits the occurrence of the next interrogate pulse to reinitiate the whole procedure.

In the foregoing descriptions of a typical dependent repeater (FIG. 2) and a typical power-feeding repeater (FIG. 3), it has been assumed that interrogation would be effected, in respect of the pair of repeaters at each repeater station, from the receive equipment REC of the terminal TERM B of a bi-directional data transmission system such as is depicted in FIG. 1. It can readily be deduced that interrogation may equally well be carried out from the receive equipment of terminal station TERM A using the B to A transmission path, although in this case the repeater stations (each with two repeaters) are interrogated in the reverse order. Interrogation and display equipment may therefore be provided at the receive equipments of both terminal stations.

However the repeaters of either transmission direction can with very simple modification be arranged so that interrogation may be effected in the same direction as data transmission rather than in the opposite direction to data transmission as hereinbefore inferred. In the dependent repeaters, such as FIG. 2, this merely involves disconnecting points J and K of transformers TR2 and TR1, and then connecting point J to gates LG1 and LG2, and also connecting point K to gates LG3 and LG4. In the power-feeding repeaters, such as that shown in FIG. 3, similar changes of connections involving points L and M would be effected.

Although the invention has been described with respect to a bi-directional data-transmission system, it is equally applicable to a system having the two repeatered transmission paths operating in the same direction. This is referred to as a parallel system and may be used, for example, in television-signal transmission, where one path is acting as standby for the other. Here again, interrogation of all pairs of repeaters in succession may be effected over either transmission path as predetermined. Moreover the interrogation may be effected in the opposite direction to data transmission or, if repeaters of the particular path are slightly modified, as already described, it may be effected in the same direction as data transmission. Indeed in either case, provision may be made for interrogation of the system from opposite ends if required; a separate transmission path then being used for each direction of interrogation.

Figure 4:
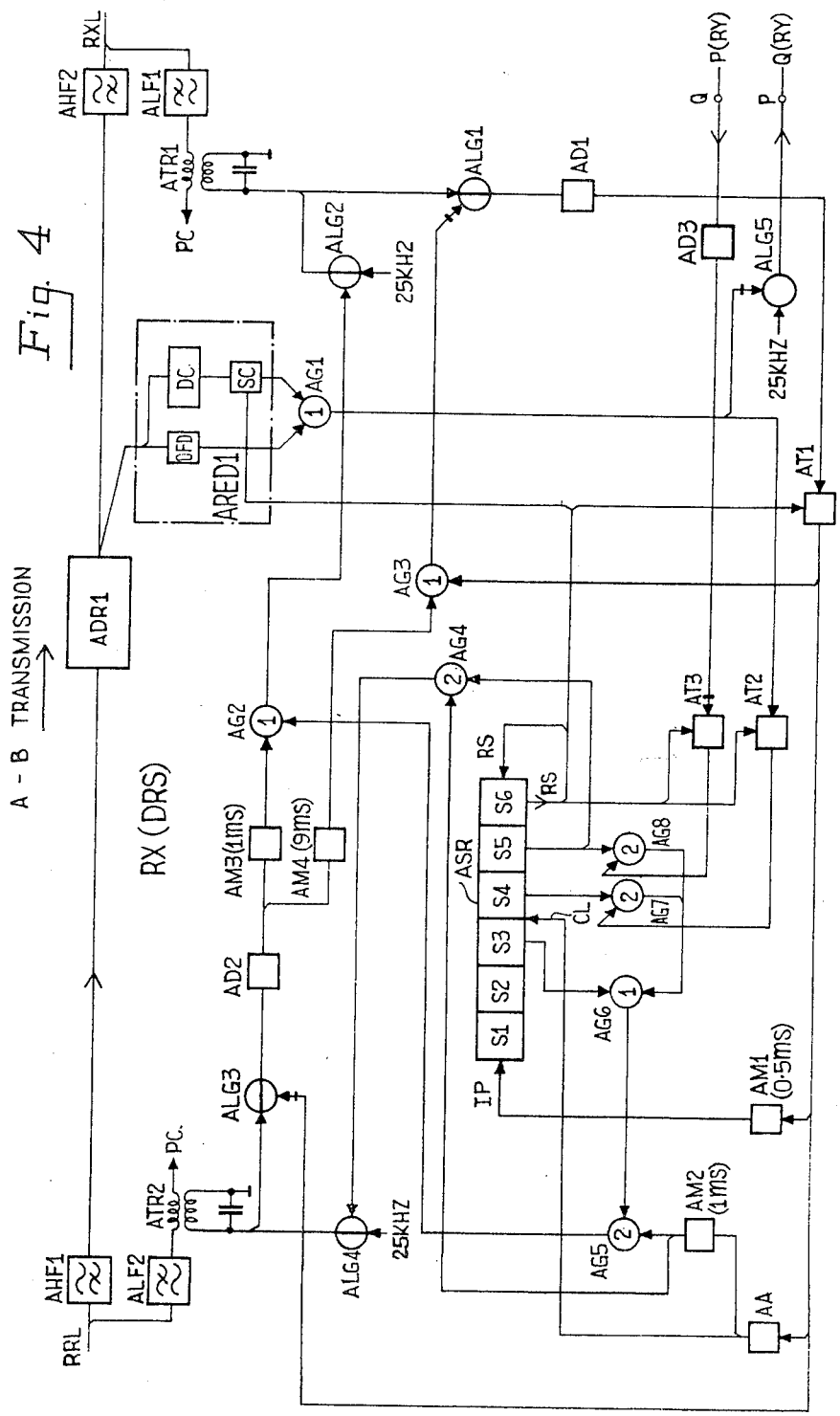
FIG. 4 shows a dependent repeater which is an alternative form to that of FIG. 2.
Figure 6:
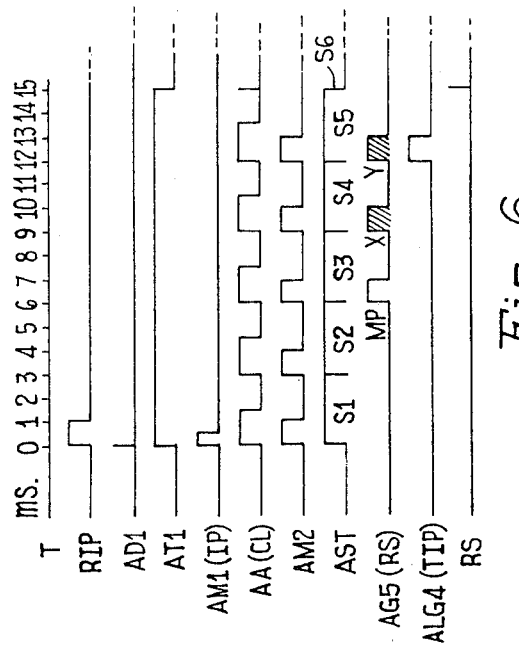
FIG. 6 is a waveform chart which will assist in the understanding of FIG. 4.

The inter-coupling of the repeaters of a station by way of lead RS (RY) (FIG. 2) or lead RS1 (RY) (FIG. 3) for resetting purposes is provided when interrogation is to be performed from either end on a mutually exclusive basis: It is pointed out that the possibility of continuous interrogation from both ends of the bothway system by way of the separate transmission paths is readily catered for by removal of the particular inter-couplings at each repeater station An alternative dependent repeater is shown in FIG. 4. The circuit arrangements of this repeater will be discussed in conjunction with the timing diagram FIG. 6. The digital-regenerator ADR1 and the related error-detector ARED1 (with its output fail detector OFD, disparity counter DC and storage counter SC) are identical with devices DR1 and RED1 respectively of the dependent repeater of FIG. 2. Also high-pass filters AHF1 and AHF2 and low-pass filters ALF2 and ALF1 are provided which correspond to devices HF1, HF2, LF2 and LF1 of FIG. 2. Again tuned (25 KHz) transformers ATR1 and ATR2 which have counterparts in FIG. 2 are provided.

The two dependent repeaters RX and RY of a station are cross-connected in respect of their P and Q leads so that, in each said repeater, a toggle device AT2 is controlled, over gate AG1, by the error-detector ARED1 of the particular repeater whereas said error detector controls the linear gate ALG5 whereby the latter extends the 25 KHz supply to lead Q of the partner repeater whenever detector ARED1 is in a fault-detecting state. Removal of the 25 KHz supply from the incoming Q lead of a repeater causes actuation of toggle AT3 over the tone-detector AD3.

The possible states of toggles AT2 and AT3 in both repeaters at any one time may be summarized thus:

| REPEATER(S) FAULTY | TOGGLE(S) SET REPEATER RX | | REPEATER RY | |
|---|---|---|---|---|
| NEITHER | NEITHER | | NEITHER | |
| BOTH | AT2 | AT3 | AT2 | AT3 |
| RX | AT2 | — | — | AT3 |
| RY | — | AT3 | AT2 | — |

Toggles AT2 and AT3 (in each repeater) when in the set state produce a "1" output condition to prime gates AG7 and AG8 respectively.

When a 25 KHz interrogate pulse (1 m.S. every 5 seconds and represented as RIP in FIG. 6) is forthcoming at the data-output path RXL, it is delivered over filter ALF1, transformer ATR1 and linear gate ALG1 to the detector AD1. Thereupon activation of the decector causes the toggle device AT1 to be set. The persistent "1" output of toggle AT1 causes detector AD1 to be released by way of gates AG3 and ALG1; it is to be noted that the disablement of gate ALG1 will ensure that detector AD1 is not affected by any ensuing response pulse. Toggle AT1 also causes (a) the monostable device AM1 to extend a single "1" pulse of 0.5 m.S. duration to be applied to the input lead IP of the 6-stage shift register ASR, and (b) repetitive setting and resetting of the astable device AA for equal periods of 1.5 m.S. each, so that "1" pulses are applied to monostable device AM2 and to the clock input lead CL of the shift register. Also for the whole period whilst toggle AT1 remains set, linear gate ALG3 (concerned with reception of response signals) is disabled.

The "1" pulse loaded into the first stage of the shift register on the occurrence of the first clock-pulse and will be advanced at 3 m.S. intervals stage-by-stage by succeeding clock-pulses. No outputs are derived from stages S1 and S2, but when the single input pulse has reached stage S3, the "1" output now produced by that stage activates gate AG6 which enables gate AG5 to produce a "1" output for the 1 m.S. set period of monostable device AM2. The response of gate AG2 to the latter, causes linear gate ALG2 to be opened for the 1 m.S. period so that an initial response or marking pulse (25 KHz) is transmitted to or towards the interrogating terminal of the data-transmission system.

After the fourth shift of the register, stage S4 produces a "1" output exclusively whereas the fifth shift will duly cause stage S5 to produce a "1" condition. Stages S4 and S5 therefore successively enable AND gates AG7 and AG8 to be controlled according to the prevailing states of toggles AT2 and AT3 respectively; gate AG7 producing a "1" if toggle AT2 is set, and gate AG8 producing a "1" if toggle AT3 is set. Gate AG6 repeats the conditions to gate AG5, and it can be deduced that, with gate AG5 controlled from monostable device AM2 (1 m.S.) and from gates AG7 and AG8, a 1 m.S. "1" pulse (X in FIG. 6) is derived from it if toggle AT2 is set; whereas a "1" pulse (Y in FIG. 6) is produced if toggle AT3 is set. Each such X and Y pulse (produced only in the event of previously described transmission fault conditions) would be effective over gates AG2 and ALG2 in causing a corresponding response signal pulse of 25 KHz to be sent over path RXL. It follows that a response signal may comprise one, two or three 1 m.S. pulses for the particular repeater and its station partner. A one-pulse signal (marking pulse only) signifies that there is no reportable transmission fault in either repeater; a first two-pulse signal formed by marking pulse and an X pulse signifies that a transmission fault is evident in repeater RX; a second two-pulse signal (marking pulse and Y pulse) indicates that repeater RY is at fault; whereas a three-pulse signal indicates that both repeaters of the station are faulty.

In addition to initiation of the procedure for the possible transmission of a response pulse during the period Y, the "1" output of stage S5 of the shift register is effective in conjunction with monostable device AM2 in activating gate AG4. Accordingly linear gate ALG4 is caused to transmit a (1 m.S. 25 KHz) interrogate pulse (TIP of FIG. 6) to the next repeater over path RRL.

On the sixth shift of register ASR, a reset pulse is produced over lead RS. This promptly resets the shift-register, together with toggles AT1, AT2 and AT3 and additionally storage counter SC of error-detector ARED1, so that the repeater resumes its quiescent state.

In the present example, the reset leads of the two repeaters of the station are not connected together so that resetting of each is performed independently, since the intention is to have continuous interrogation from both ends of the data transmission system.

Response signals are duly forthcoming from the next repeater over path RRL and each pulse of a one-, two- or three-pulse signal is accepted by the second of filters ALF2 and ALF1 and is passed over transformer ATR2 and gate ALG3 to effect operation of the detector AD2. Monostable device AM3 responds to each pulse of such a response signal, whereupon gate AG2 is actuated to open linear gate ALG2 which in effect reproduces the 1 m.S. 25 KHz pulse at path RXL of the repeater. Monostable device AM4 is set promptly by the initial or marking pulse of the signal, and remains so for 9 m.S. Accordingly, gate ALG1 is disabled for this period to ensure that detector AD1 is isolated from one, two or three outgoing response-signal pulses transmitted during said period. The repeaters of FIGS. 2–3 operate in a similar manner to reproduce the response signals forthcoming from succeeding repeaters.

Figure 5:
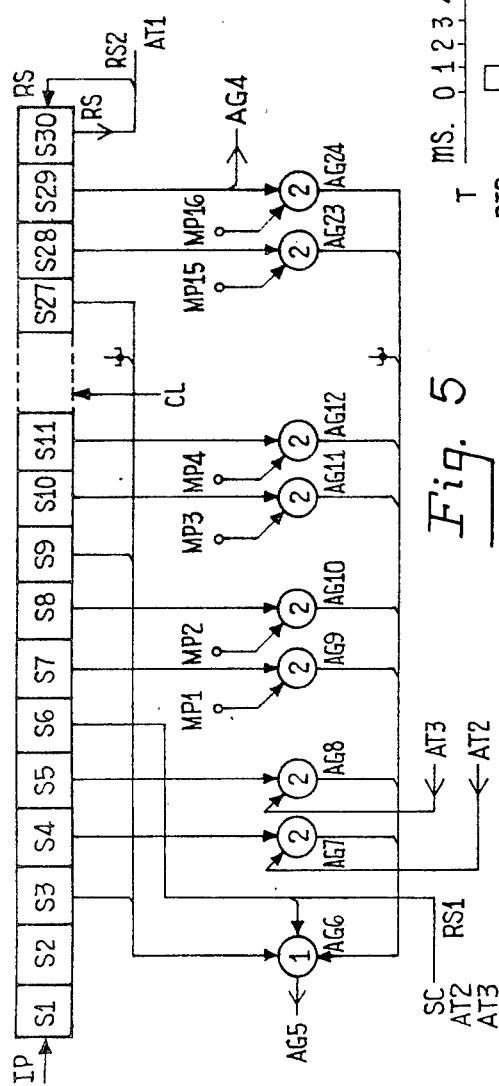

An alternative power-feeding repeater is shown in FIG. 5. When a bi-directional data transmission system as outlined in FIG. 1 is provided with dependent repeater stations each comprising two repeaters of the kind represented in FIG. 4, the additional signalling requirements of power-feeding repeaters are met by utilising repeaters as of FIG. 4 but each modified in accordance with FIG. 5. As in the power-feeding repeater of FIG. 3, signalling in respect of 16 monitoring points MP1 to MP16 is catered for. Accordingly the 6-stage shift register of FIG. 4 is replaced by one with 30 stages of which the last (stage S30) is concerned with the resetting of toggle AT1 whereas stage S6 remains concerned with resetting counter SC and toggles AT2 and AT3.

As a result of an interrogate pulse being received at path RXL of the modified repeater, toggle AT1 is set and as before a "1" condition is loaded into the shift register by the first-developed clock-pulse. The shift function proceeds under control of successive clockpulses and stages S3, S4 and S5 duly perform the functions already described in respect of development of the one-, two- or three-pulse response signal. However, stage S5 does not control gate AG4 which instead is controlled by stage S29 for the eventual transmission of the necessary interrogate pulse over path RRL to the next repeater.

When stage S6 produces a "1" output, a reset pulse is extended over lead RS1 to the storage counter SC and toggles AT2 and AT3 of the particular repeater. Moreover stage S6 is operative at an additional input lead of gate AG6 to enable an additional marking pulse to be transmitted under control of gates AG5, AG2 and ALG2 to path RXL of the repeater preparatory to the possible transmission of pulses in respect of monitoring points MP1 and MP2. Gates AG9 and AG10 successively receive "1" signals from register stages S7 and S8 respectively and the gates are individually actuated or not according to whether points MP1 and MP2 are at "1" or "0". Each time such a gate is opened, gate AG5 is actuated for a 1 m.S. period defined by monostable device AM2, and therefore initiation of the last-mentioned marking pulse may be followed at 3 m.S. intervals by up to two response signal pulses appertaining to points MP1 and MP2.

The shifting function of the register continues under control of the, 1.5 m.S. clock pulses repeated every 3 m.S., and it can be deduced that at those times when the stored signal appears in stages S9, S12, S15, S18, S21, S24 and S27, a further marking pulse is developed. Each such marking pulse may be followed or not by a pulse in either or both of the two periods when the ensuring two stages S10 and S11 . . . S28 and S29 are active. Also when stage S29 is finally active, the "1" condition applied to gate AG4 causes the necessary interrogate signal pulse to be advanced to the next repeater of the system. Ultimately when stage S30 becomes active the before-mentioned reset pulse is obtained and, besides being used to reset the shift register over lead RS, is effective over lead RS2 to cause resetting of toggle AT1. This returns the power-feeding repeater to its quiescent state in readiness for regeneration of response signals delivered from the next repeater in the transmission route.

In a bothway data-transmission in accordance with FIG. 1, and using dependent and power-feeding repeaters described with reference to FIGS. 4 and 5 described above, the particular repeaters, although readily adaptable for interrogation in the various ways described with reference to FIGS. 2 and 3, are arranged for continous sequential interrogation from equipment REC of both terminal equipment TERM A and TERM B. Interrogation in both directions is initiated by a 1 m.S. interrogate pulse which is repeated every 5 seconds. Considering the sequence in respect of the transmission path involving repeaters RX (i.e. from terminal TERM B) the initial interrogate pulse is transmitted from an equipment REC to the adjacent dependent repeater. Successful reception of the interrogate pulse causes said repeater to initiate its response-pulse sequence, whereby a 1 m.S. (25 KHz) marking pulse MP is transmitted 6 m.S. after the start of the interrogate pulse with the possibility of transmission of an X pulse and a Y pulse (both also 1 m.S.) after further periods of 3 m.S. if repeaters RX and RY respectively of the station are faulty as described. Thus repeater transmits a response signal which comprises a marking pulse if the station is fault free; two pulses (MP plus X or Y) if repeater X or Y is faulty; or three pulses (MP, X and Y) if both repeaters have reportable transmission faults.

Coincidentally with the period allocated for possible transmission of a Y pulse, the repeater generates a 1 m.S. interrogate pulse which is extended, against the direction of data transmission to the next RX dependent repeater. After a further interval of 3 m.S. the repeater is reset so that for a period of substantially 5 seconds the repeater is available for regeneration of response signals.

The procedure is gone over again in the next repeater as a result of the regenerated interrogate pulse, and so a succession of dependent repeaters RX will each, when no fault is detected, cause a one-pulse (marking) response signal to be sent back, over intervening repeaters, to the interrogating terminal equipment in its particular time-slot; a two or three-pulse response signal being sent under appropriate conditions of fault.

When the last of succession of dependent repeaters regenerates an interrogate pulse and transmits it to a power feeding repeater, the latter performs identically with a dependent repeater in respect of the response-pulse sequence (one two or three pulses) appertaining to reportable transmission faults, but an interrogate pulse is not regenerated at this juncture. However, a succession of eight further marking pulses (9 m.S. intervals) are transmitted back to the interrogating terminal station; each followed or not by an X pulse and/or a Y pulse according to the states of a relevant pair of monitoring points of the station. During the period allocated for possible transmission of the last (eighth) pulse, the power-feeding repeater regenerates the interrogate pulse to the next dependent repeater, and, 3 m.S. after the start of the interrogate pulse, the power-feeding repeater is finally released in readiness for the regeneration of response signals duly returned to it. In due course, the last repeater of the series applies an interrogate pulse to the transmission equipment TRANS of terminal TERMINAL to enable the final response signal to be developed thereby and so to complete the whole interrogation sequence.

With continuous interrogation of the repeater stations in the reverse order from equipment REC at terminal equipment TERM A also taking place, the state of the system is made evident at both terminals. By analysis of the sequence of response signals each terminal equipment is able to determine the state of the system for the location of any faults or possible conditions of fault.

What we claim is:

1. A repeater station comprising a first repeater for a digital data-transmission system using a disparity-displaying digital code, said first repeater including a digital regenerator which has an error-detecting means connected thereto to continuously monitor the output thereof, supervisory control means also incorporated in the repeater operative upon reception of an interrogate pulse signal, over one access path also used as a digital data-transmission path, to cause a response signal to be returned over said access path according to the prevailing state of said error-detecting means, said response signal having a succession of timed parts and comprising a different number of pulses each in a different said time part for each of the two possible output states of said error-detecting means, a second repeater at the repeater station, both repeaters including at least substantially identical digital regenerators and error-detecting means, and being incorporated in different access paths, said repeaters being so interconnected that the reception of said interrogate pulse signal by said first repeater is effective in that said supervisory control means is operative to ensure that the aforesaid response signal includes a pulse within the first of said timed parts and is also indicative of the prevailing state of the error-detecting means monitoring the digital regenerator of the second repeater.

2. A repeater station as claimed in claim 1 in which said supervisory control means in also operative to cause a plurality of additional monitoring points of the station, each having two possible states, to be successively monitored subsequent to generation of said response signal and to enable another said response signal to be returned over said access path in respect of the state of each said additional monitoring points.

3. A repeater station as claimed in claim 1 in which the response signal comprises one pulse to signify that neither error-detecting means is in the state of having detected a fault condition, three pulses to signify that both of said error-detecting means are in said state, or two pulses to signify that either of said error-detecting means is in said state, the particular error-detecting means being identified by the spatial relationship of the two pulses.

4. A repeater station as claimed in claim 3 in which said supervisory control means is also operative to cause a plurality of additional monitoring points of the station, each having two possible states, to be successively monitored subsequent to generation of said response signal and to enable another said response signal comprising one, two or three pulses to be returned over said access path in respect of the state of each said additional monitoring points.

5. A digital-data-line-transmission system comprising two repeated digital data-transmission paths, also used as access paths, between terminal stations, in which a plurality of repeater stations as claimed in claim 1 are provided between said terminal stations and, as a result of an interrogate pulse signal generated at one said terminal station and applied to one access path serving a corresponding repeater of each repeater station, the supervisory control means of each said repeater successively upon reception of an interrogate pulse being operative to return a response signal to its access path and to effect delayed regeneration of the received interrogate pulse signal to a succeeding repeater (if any) of said access path; the supervisory control means of each repeater also being controlled by reception of a response signal forthcoming over the access path from or by way of said succeeding repeater to regenerate that response signal and apply it to its access path, the regeneration of the response signal being effected by means other than the said digital regenerator.

* * * * *